United States Patent [19]
Inaba et al.

[11] 3,803,431
[45] Apr. 9, 1974

[54] ELECTRIC PULSE MOTOR

[75] Inventors: Seiuemon Inaba; Kanryo Shimizu; Shigeaki Oyama, all of Kawasaki, Japan

[73] Assignee: Fujitsu Limited, Kanagawa-ken, Japan

[22] Filed: Aug. 20, 1973

[21] Appl. No.: 389,586

Related U.S. Application Data
[63] Continuation of Ser. No. 201,759, Nov. 24, 1971, abandoned.

[52] U.S. Cl.................. 310/49, 310/268, 310/216
[51] Int. Cl......................................... H02k 37/00
[58] Field of Search.......... 310/49 R, 268, 216–218, 310/46, 162–164

[56] References Cited
UNITED STATES PATENTS
3,483,406  12/1969  Inaba et al...................... 310/268 X
3,469,123  9/1969   Inaba et al...................... 310/268 X
570,914    11/1896  Dorman.......................... 310/268 X

*Primary Examiner*—D. F. Duggan
*Attorney, Agent, or Firm*—Maleson, Kimmelman & Ratner

[57] ABSTRACT

The disclosure relates to an improved electric pulse motor having an arrangement wherein, with respect to a rotor element, a stator assembly including a number of geometrically and electrically paired U-shape stator elements are assembled based upon the conventional arrangement, however, each pair of stator elements is provided with a spacer member to define the smallest possible air gap to provide a larger magnetic attractive force for the rotor element which freely rotates in the air gap and also, includes a U-shape laminated stator core having smaller iron loss as compared with the conventional mass-form stator core, which is manufactured by dividing a roll of strip of magnetic material into halves at a diameter of the circular roll.

2 Claims, 3 Drawing Figures

ELECTRIC PULSE MOTOR

This is a continuation, of application Ser. No. 201,759, filed Nov. 24, 1971, now abandoned.

DESCRIPTION OF THE INVENTION

The present invention relates generally to an improvement of an electric pulse motor, and more particularly to an improved structure of the stator element of an electric pulse motor.

In the conventional arrangement of the electric pulse motor there is provided, with respect to a rotor element rotatably supported in casing elements and provided with a number of equiangularly spaced rotor-teeth projecting radially from a circumference of the element, a number of U-shape stator elements fixedly mounted in the casing elements and having a predetermined angular relationship between each successive pair in the circumferential direction relative to the axis of the rotor element, each pair being located in a mutually opposed arrangement on the side of the rotor element and each element provided with a number of stator-teeth having respective angular spaces equal to and facing the rotor-teeth.

In the conventional arrangement, the paired stator elements have different electric phases, successively such that when the successive stator elements are excited in a predetermined time sequence by electric pulse inputs, the rotor element rotates to issue a rotary output through the action of magnetic attractive force produced in the excited stator elements.

The above-described conventional electric pulsemotor is accompanied by several disadvantages such as limited output power high cost and difficulty in manufacturing and fabricating.

This is due to the reason that the respective stator elements consist of a massy and non-laminated stator core having large iron loss as one of the electrical characteristics thereof and which is usually machined out of a mass of magnetic material.

In accordance with one of the features of the present invention, an electric pulse motor is provided with stator elements comprising U-shape laminated stator cores which are manufactured by cutting a roll of magnetic strip material at a diameter of the roll so as to form two U-shape core pieces.

The principal object of the present invention is to provide an electric pulse motor of high output power.

Another object of the present invention is to provide an electric pulse motor which can be cheaply made with easily manufactured stator elements.

Further objects and advantages will become apparent from the ensuing description with reference to the accompanying drawings wherein.

Figure 1:
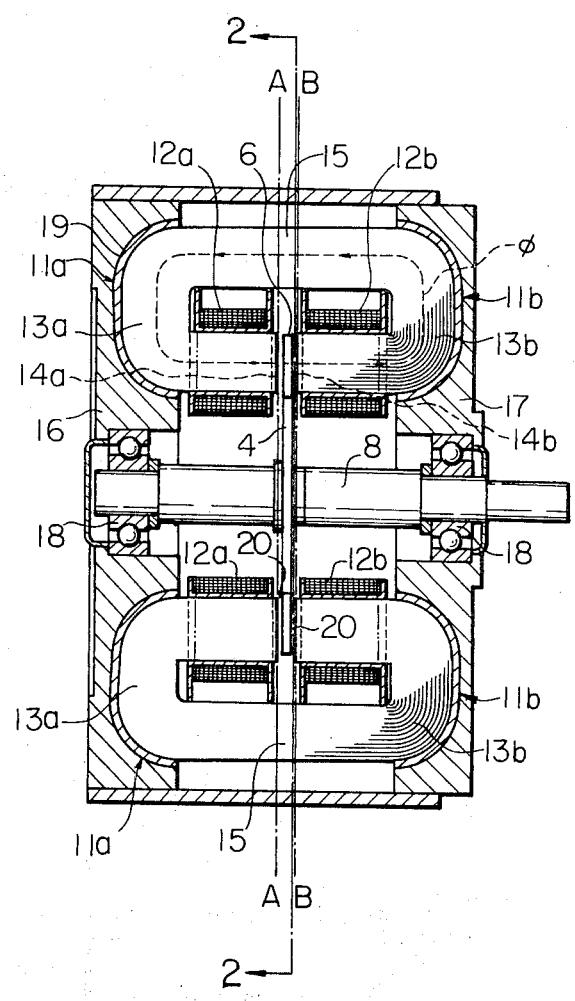
FIG. 1 is a longitudinal sectional view schematically showing an electric pulse motor of the present invention but with the arrangement based upon the conventional electric pulse motor.
Figure 2:
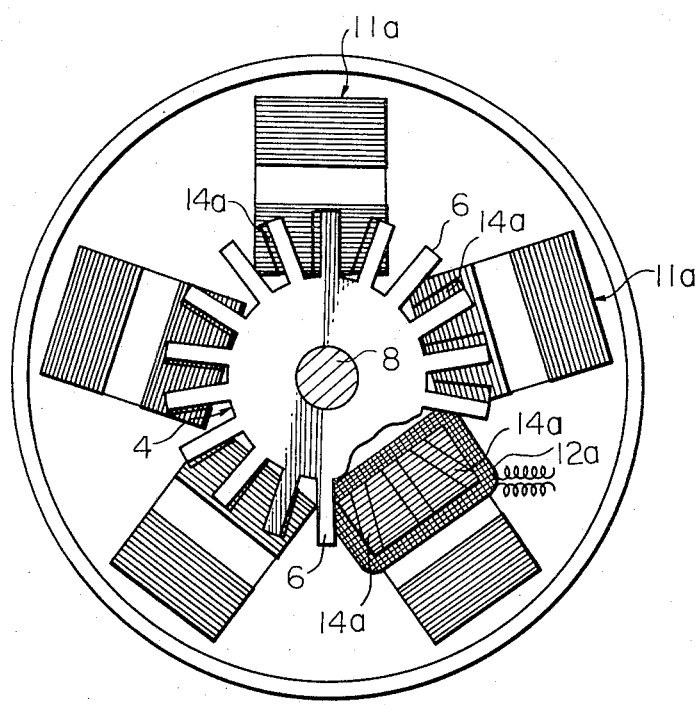
FIG. 2 is a sectional view taken along line 2—2 of FIG. 1.

Referring now to FIGS. 1 and 2, rotor shaft 8 of rotor element 4 is rotatably supported at the axially opposed end portions thereof by means of ball bearings 18 which are co-axially mounted in casings 16 and 17.

Rotor element 4 is provided with a number of radially projecting rotor-teeth 6 which are arranged with equiangular spaces between them that is to say, rotor-teeth 6 are arranged at the same pitch.

As is clearly shown in FIG. 1, two U-shape geometrically and electrically paired stator elements 11a, 11b comprising laminated stator cores 13a, 13b of the present invention opposed to one another at a position beyond the portion of rotor-teeth 6 of rotor element 4. And a number of pairs of stator elements 11a, 11b are mounted and fixed in casings 16 and 17 by means of adhesive 19 e.g., synthetic resin adhesive, in a manner such that they are in a radial form with respect to the axis of the rotor element 4 and at the same time having a predetermined angular relationship between successive pairs around the rotor element 4 so that they function as a stator assembly having a number of different electric phases capable of presenting a stepped drive force to the rotor element 4 in response to electric pulse inputs.

The U-shape stator elements 11a, 11b are provided with a number of stator-teeth 14a, 14b of the same pitch as the rotor-teeth 6, respectively, formed on the inner end surface of each stator element.

It will be clearly understood from FIG. 2 that each stator element 13a or 13b is machined on the inner end surface thereof to form the above-mentioned stator-teeth 14a or 14b which face the rotor-teeth 6 in the axial direction.

Excitation windings 12a, 12b wound on the inventional laminated stator cores 13a, 13b of each paired stator elements 11a, 11b are connected either in series or in parallel to be of the same electrical phase at every pair. The paired excitation windings 12a, 12b produce a magnetic flux $\phi$, as shown in FIG. 1, which passes through the interior of paired laminated stator cores 13a, 13b and the rotor-teeth 6 when excited by the corresponding input pulse current.

In accordance with another feature of the present invention, a spacer member 15 is fixedly inserted between each pair of U-shape laminated stator cores 13a, 13b to define a predetermined space between the opposing end surfaces of the cores.

This spacer member 15 is made of magnetic material e.g., magnetic steel so that above-mentioned magnetic flux an easily pass therethrough.

The advantages due to the presence of this spacer member will be described, hereinafter, in detail.

Generally, axial air gaps 20 defined between rotor-teeth 6 and stator-teeth 14a, 14b for free rotation of rotor element 4 are made the minimum possible value (they usually are from 0.005 milli-meter) so as to effectively retain the magnetic attractive force acting between rotor-teeth 6 and stator-teeth 14a, 14b when stator elements 11a, 11b are excited. Accordingly, in the assembly process of an electric pulse motor, the end surfaces A and B shown in FIG. 1, of stator cores 13a, 13b mounted in respective casings 16, 17 are usually machined by a grinding machine to obtain a flat surface, and then the motor is finally assembled so that both end surfaces A and B are positioned so as to be normal to the axis of rotor shaft 8 as well as parallel to each another so as to define the above-mentioned air gaps 20.

The above-mentioned machining process by means of a grinding machine is required as a usual process for the purpose of deburring after the milling operation to form stator-teeth 14a, 14b on the inner end surface of stator core 13a or 13b.

The arrangement of the electric pulse motor of the present invention in which spacer members 5 are inserted between respective pairs of stator elements is intended not only to maintain the above-mentioned normality and parallelism but also to define small and accurate air gaps 20. Thus, the largest possible magnetic attractive force acts between the stator-teeth 14a, 14b and rotor-teeth 6 through air gaps 20 can be provided so as to deliver the largest possible output by the rotor shaft 8 of the electric pulse motor. Further, the above-mentioned capability of maintaining the normality and the parallelism reduces undersired load and friction at the ball bearings 28 during rotation of the rotor element 4, thus providing longer life of the ball bearings 18.

Preferably, the spacer member 15 is provided in a laminated form consisting of magnetic steel laminations or like material to reduce iron loss therein, however, it may be in plate-form, if the member itself is relatively thin.

Figure 3:
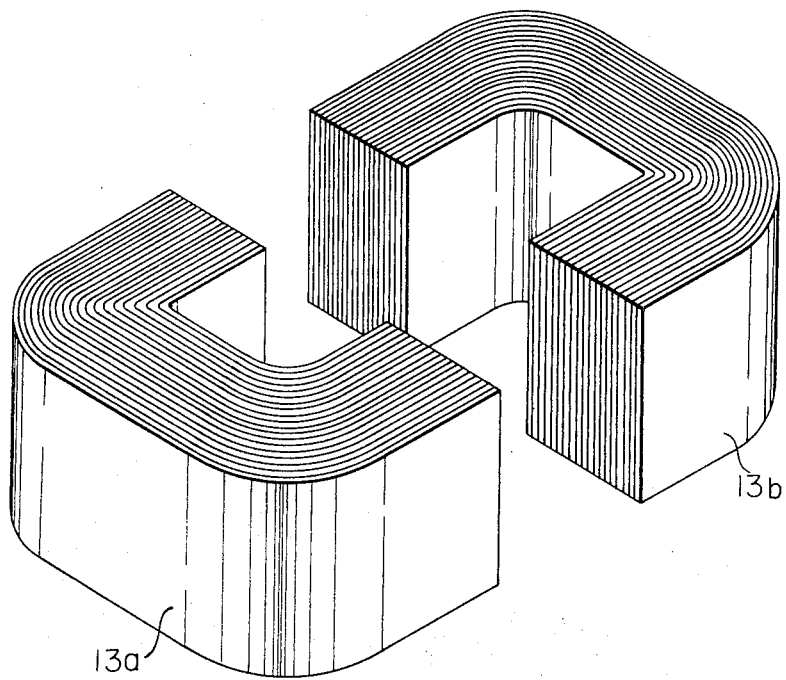
FIG. 3 is a perspective view of a pair of stator cores according to the present invention.

Referring now FIG. 3, the U-shape laminated structure of the pair of stator cores 13a and 13b of the present invention is specifically shown.

As will be understood from FIG. 3, a pair of U-shape laminated stator cores 13a and 13b is made by cutting a roll of magnetic material strip e.g., an anisotropic silicone steel plate of preselected width, in a diameter of the roll. This roll, of course is bonded and electromagnetically insulated by suitable adhesive e.g., synthetic region material between each lamination thereof.

Since the use of stator cores 13a, 13b having a laminated structure reduces iron loss as compared with the conventional mass-formed stator core, the electric pulse motor of the present invention provides larger output power.

Further, since stator-teeth 14a, 14b can be simply formed by machining an end surface only of the stator cores 13a, 13b a remarkable decrease in the time required for the manufacturing process of the pulse motor, which is certainly accompanied by reduction of cost, can be effected as compared with the conventional process wherein not only stator-teeth but also the mass-formed stator core itself is made from a piece of magnetic material through a machining process.

Still further, since the manufacturing process of the stator core of the present invention decreases waste of material as compared with the conventional process, reduction of the manufacturing cost is again effected.

We claim:
1. An electric pulse motor comprising:
a single rotor having a rotor shaft and a plurality of radially projecting rotor teeth equiangularly spaced on a circumference of the rotor shaft;
casing means comprising first and second casings;
bearing means mounted on each of said first and second casings for rotatably supporting the rotor;
a stator including a plurality of geometrically and electrically paired U-shape stator elements mounted stationary in the casings while maintaining predetermined spaces between different paired stator elements, each said paired U-shape stator element consisting of first and second U-shape stator cores, each made of U-shape magnetic material laminations, said first U-shape stator cores being fixed in said first casing and said second U-shape stator cores being fixed in said second casing, said paired U-shape stator cores having (1) first mutually opposing and connectable end surfaces and (2) second mutually opposing end surfaces provided with stator teeth formed thereon to axially face said rotor teeth with axial air gaps formed between said stator teeth and said rotor teeth;
excitation winding means would around a position of each U-shape stator core close to the second end surface, and;
connecting means for securing said first casing with respect to said second casing so that said first mutually opposing end surfaces of said paired U-shape stator cores are connected and said second mutually opposing end surfaces define said air gaps.

2. An electric pulse motor as claimed in claim 1, wherein said respective paired U-shape stator elements are provided with spacer members made of magnetic material inserted between said first end surfaces to define predesigned air gaps between said second end surfaces and said rotor teeth.

* * * * *